(12) United States Patent
Kang et al.

(10) Patent No.: US 11,465,936 B2
(45) Date of Patent: Oct. 11, 2022

(54) GLASS ARTICLE AND METHOD FOR PRODUCING THE SAME

(71) Applicant: Samsung Display Co., LTD., Yongin-si (KR)

(72) Inventors: Byung Hoon Kang, Hwaseong-si (KR); Seung Kim, Seongnam-si (KR); Young Ok Park, Hwaseong-si (KR); Su Jin Sung, Hwaseong-si (KR); Gyu In Shim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/945,606

(22) Filed: Jul. 31, 2020

(65) Prior Publication Data

US 2021/0188703 A1   Jun. 24, 2021

(30) Foreign Application Priority Data

Dec. 23, 2019   (KR) .................. 10-2019-0172890

(51) Int. Cl.
| | |
|---|---|
| *B32B 15/04* | (2006.01) |
| *B32B 17/06* | (2006.01) |
| *C03C 21/00* | (2006.01) |
| *C03C 3/083* | (2006.01) |

(52) U.S. Cl.
CPC ............ *C03C 21/002* (2013.01); *C03C 3/083* (2013.01)

(58) Field of Classification Search
CPC .................................................. C03C 21/002

USPC ................................................ 428/410, 426
See application file for complete search history.

(56) References Cited

U.S. PATENT DOCUMENTS

| | | | |
|---|---|---|---|
| 8,075,999 B2 | 12/2011 | Barefoot et al. | |
| 9,567,254 B2 | 2/2017 | Amin et al. | |
| 10,118,858 B2 | 11/2018 | Amin et al. | |
| 2015/0239775 A1* | 8/2015 | Amin | C03C 3/091 |
| | | | 428/220 |
| 2017/0158556 A1* | 6/2017 | Dejneka | G06F 1/1637 |
| 2017/0295657 A1* | 10/2017 | Gross | H05K 5/0217 |
| 2019/0375679 A1* | 12/2019 | Gross | C03C 21/002 |

FOREIGN PATENT DOCUMENTS

| | | |
|---|---|---|
| JP | 6538919 | 7/2019 |
| KR | 101639221 | 7/2016 |
| KR | 101665998 | 10/2016 |

* cited by examiner

*Primary Examiner* — Lauren R Colgan
(74) *Attorney, Agent, or Firm* — Cantor Colburn LLP

(57) ABSTRACT

A glass article includes lithium alumino-silicate ("LAS"), a first surface, a second surface opposed to the first surface, a first compressive region extended from the first surface to a first compression depth, a second compressive region extended from the second surface to a second compression depth, and a tensile region disposed between the first compression depth and the second compression depth, wherein a stress profile in the first compressive region comprises a first segment provided between the first surface and a first transition point and a second segment provided between the first transition point and the first compression depth, and wherein a ratio of a stress at the first transition point to a stress at the first surface ranges from 0.22 to 0.47.

16 Claims, 16 Drawing Sheets

GLASS ARTICLE AND METHOD FOR PRODUCING THE SAME

This application claims priority to Korean Patent Application No. 10-2019-0172890 filed on Dec. 23, 2019, and all the benefits accruing therefrom under 35 U.S.C. § 119, the content of which in its entirety is herein incorporated by reference.

BACKGROUND

1. Field

Exemplary embodiments of the invention relate to a glass article and a method for producing the same.

2. Description of the Related Art

Glass articles are widely used in electronic devices including display devices or construction materials. A glass article is employed by a substrate of a flat-panel display device such as an organic light-emitting diode ("OLED") display device, a micro LED display device, a nano LED display device, a quantum-dot light-emitting display device, a liquid-crystal display device, a plasma display device, a field emission display device, an electrophoretic display device and an electrowetting display device, or a window protecting the same.

As portable electronic devices such as smart phones and tablet personal computers ("PCs") prevail, a glass article applied to the portable electronic devices is frequently exposed to external impact. In order to improve the portability of such electronic display devices, a glass article that is thin and thus easy to carry and has good strength for withstanding external impact is desired.

SUMMARY

Exemplary embodiments of the invention provide a glass article having a good strength.

Exemplary embodiments of the invention also provide a method for producing a glass article having a good strength via a single-stage tempering process.

An exemplary embodiment of a glass article includes lithium alumino-silicate ("LAS"), a first surface, a second surface opposed to the first surface, a first compressive region extended from the first surface to a first compression depth, a second compressive region extended from the second surface to a second compression depth, and a tensile region disposed between the first compression depth and the second compression depth, where a stress profile in the first compressive region includes a first segment provided between the first surface and a first transition point and a second segment provided between the first transition point and the first compression depth, and where a ratio of a stress at the first transition point to a stress at the first surface ranges from 0.22 to 0.47.

Another exemplary embodiment of a glass article produced via a single-stage tempering process includes a first surface, a second surface opposed to the first surface, a first compressive region extended from the first surface to a first compression depth, a second compressive region extended from the second surface to a second compression depth, and a tensile region disposed between the first compression depth and the second compression depth, where a compressive stress of the first surface ranges from 450 megapascals (MPa) to 650 MPa, where the first compression depth ranges from 90 micrometers ("μm") to 120 μm, where a stress profile of the first compressive region has a first transition point at a depth of 7 μm to 15 μm and a stress of 100 MPa to 220 MPa, where a ratio of a stress at the first transition point to a stress at the first surface ranges from 0.22 to 0.47, and where a stress profile in the second compressive region is symmetric with the stress profile in the first compressive region.

An exemplary embodiment of a method of producing a glass article includes providing a LAS-based glass, and a first tempering of immersing the LAS-based glass in a mixed molten salt, where a proportion of sodium ions in cations in the mixed molten salt ranges from 20 mol % to 30 mol %, and a proportion of potassium ions therein ranges from 70 mol % to 80 mol %, and where the first tempering is carried out once at a temperature of 390 degrees Celsius (° C.) to 410° C. for one hour to two hours.

It should be noted that features of the invention are not limited to the above-mentioned object, and other features of the invention will be apparent to those skilled in the art from the following descriptions.

In an exemplary embodiment of the invention, a glass article may have a high strength such that it is not easily broken by an external impact. In addition, it is produced via a single-stage tempering process so that the time desired for tempering may be reduced and the cost may be saved.

In an exemplary embodiment of the invention, there is provided a method for producing a glass article, by which the time desired for tempering may be shortened as it is performed via a single-stage tempering process, and the cost may be saved.

It should be noted that effects of the invention are not limited to those described above and other effects of the invention will be apparent to those skilled in the art from the following descriptions.

BRIEF DESCRIPTION OF THE DRAWINGS

The above and other advantages and features of the invention will become more apparent by describing in detail exemplary embodiments thereof with reference to the attached drawings, in which.

DETAILED DESCRIPTION

Figure 1:
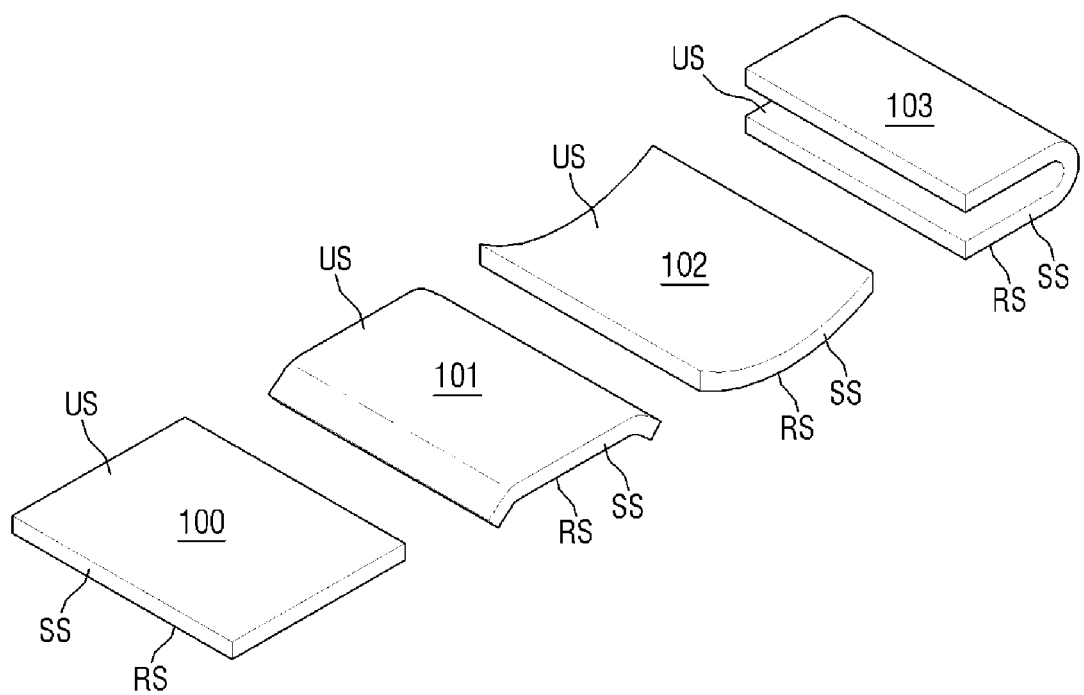
FIG. 1 is a perspective view of an exemplary embodiment of glass articles.

Exemplary embodiments of the invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will fully convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Although the terms "first", "second", etc., may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc., may also be used herein to differentiate different categories or sets of elements. For conciseness, the terms "first", "second", etc., may represent "first-category (or first-set)", "second-category (or second-set)", etc., respectively.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. When the device in the drawing figures is turned over, elements described as "below" or "beneath" other elements or features would then be oriented "above" the other elements or features, for example. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The same reference numbers indicate the same components throughout the specification.

As used herein, a "glass article" refers to an article that entirely consists of or partially includes glass.

Hereinafter, exemplary embodiments of the invention will be described with reference to the accompanying drawings.

FIG. 1 is a perspective view of an exemplary embodiment of glass articles.

The glass is used as a cover window for protecting a display, a substrate for a display panel, a substrate for a touch panel, an optical member such as a light guide plate, etc. in electronic devices including a display, such as a tablet personal computer ("PC"), a notebook PC, a smart phone, an electronic book, a television and a PC monitor as well as a refrigerator and a washing machine including a display screen. Glass may also be employed as a cover glass for an instrument panel in a vehicle, a cover glass for solar cells, interior materials for construction materials, windows for buildings and houses, etc.

Some glasses are desired to have high strength. In an exemplary embodiment, when glass is employed as a window, it is desirable to have a small thickness and a high strength such that it is not easily broken by an external impact, since it is desired to have a high transmittance and a small weight. Glass having a high strength may be produced by, for example, chemical tempering or thermal tempering. Examples of various shapes of tempered glasses are shown in FIG. 1.

Referring to FIG. 1, in an exemplary embodiment, the glass article 100 may have the shape of a flat sheet or a flat plate. In another exemplary embodiment, the glass articles 101, 102 and 103 may have a three-dimensional shape including bent portions. In an exemplary embodiment, the edge of the flat portion may be curved (e.g., the glass article 101), the entire surface may be curved (e.g., the glass article 102) or folded (the glass article 103), for example.

The shape of the glass articles 100 to 103 may be, but is not limited to, a quadrangle (e.g., rectangle) from the top. In an exemplary embodiment, the glass articles 100 to 103 may have various shapes such as a rounded rectangle, a square, a circle, and an ellipse. In the following description, the glass articles 100 to 104 having the shape of a rectangular flat plate will be described as an example. It is, however, to be understood that the invention is not limited thereto.

Figure 2:
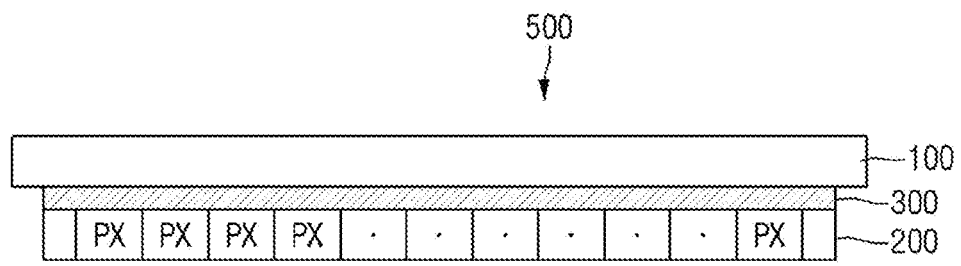
FIG. 2 is a cross-sectional view showing an exemplary embodiment in which the glass article is employed as a cover window of a display device according to the invention.

FIG. 2 is a cross-sectional view showing an exemplary embodiment in which the glass article 100 is employed as a cover window of a display device according to the invention.

Referring to FIG. 2, a display device 500 may include a display panel 200, a cover window 100 disposed on the display panel 200, and an optically transparent coupling layer 300 disposed between the display panel 200 and the cover window 100 to couple them.

The display panel 200 may include, for example, a self-luminous display panel such as an organic light-emitting diode ("OLED") display panel, an inorganic light-emitting (inorganic "EL") display panel, a quantum-dot light-emitting ("QED") display panel, a micro-LED display panel, a nano-LED display panel, a plasma display panel ("PDP"), a field emission display ("FED") panel and a cathode-ray tube ("CRT") display panel as well as a light-receiving display panel such as a liquid-crystal display ("LCD") panel and an electrophoretic display ("EPD") panel.

The display panel 200 may include a plurality of pixels PX and may display images by light emitted from each of pixels PX. The display device 500 may further include a touch member (not shown). In an exemplary embodiment of the invention, the touch member may be incorporated into the display panel 200. In an exemplary embodiment, the touch member is disposed directly on a display member of the display panel 200 and thus the display panel 200 itself may perform a touch feature, for example. According to another exemplary embodiment, the touch member may be fabricated separately from the display panel 200 and then attached to the upper surface of the display panel 200 by an optically transparent coupling layer.

The cover window 100 is disposed on the display panel 200. The cover window 100 protects the display panel 200. The body of the cover window 100 may include the tempered glass article 100. The cover window 100 may be larger than the display panel 200 so that side surfaces thereof may protrude outwardly from the side surfaces of the display panel 200. It is, however, to be understood that the invention is not limited thereto. The cover window 100 may further include a printed layer disposed on at least one surface of the glass article 100 at the edge of the glass article 100. The printed layer of the cover window 100 may prevent the bezel of the display device 500 from being seen from the outside and may give a decoration in some implementations.

The optically transparent coupling layer 300 is disposed between the display panel 200 and the cover window 100. The optically transparent coupling layer 300 serves to fix the cover window 100 on the display panel 200. In an exemplary embodiment, the optically transparent coupling layer 300 may include an optically clear adhesive ("OCA"), an optically clear resin ("OCR"), etc., for example.

Hereinafter, the above-described tempered glass article 100 will be described in more detail.

Figure 3:
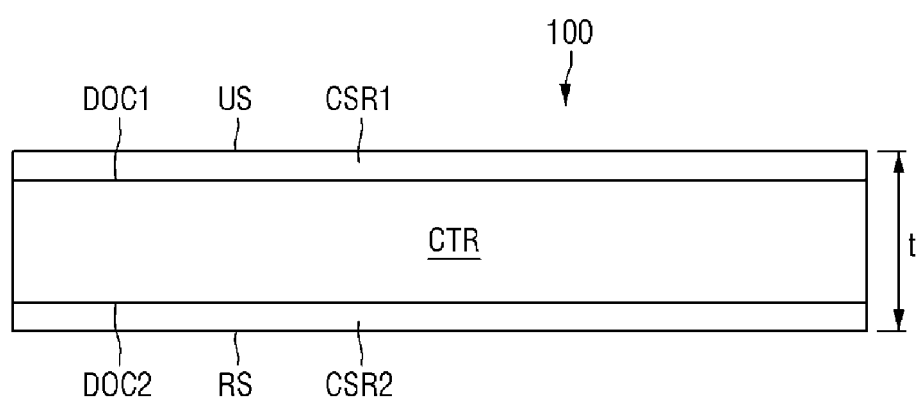
FIG. 3 is a cross-sectional view of an exemplary embodiment of a glass article having the shape of a flat plate according to the invention.

FIG. 3 is a cross-sectional view of an exemplary embodiment of the glass article 100 having the shape of a flat plate according to the invention.

Referring to FIG. 3, the glass article 100 may include a first surface US, a second surface RS, and side surfaces SS. In the glass article 100 having the shape of a flat plate, the first surface US and the second surface RS are main surfaces having a large area, and side surfaces SS are outer surfaces connecting the first surface US with the second surface RS.

The first surface US and the second surface RS are opposed to each other in the thickness direction. When the glass article 100 serves to transmit light like the cover window 100 of a display, the light may be mainly incident on one of the first surface US and the second surface RS to exit through the other of the first surface US and the second surface RS.

The thickness t of the glass article 100 is defined as the distance between the first surface US and the second surface RS. In an exemplary embodiment, the thickness t of the glass article 100 may range, but is not limited to, from 0.1 millimeter (mm) to 2 mm, for example. In an exemplary embodiment, the thickness t of the glass article 100 may be equal to or less than approximately 0.8 mm, for example. In another exemplary embodiment, the thickness t of the glass article 100 may be equal to or less than approximately 0.75 mm, for example. In yet another exemplary embodiment, the thickness t of the glass article 100 may be equal to or less than approximately 0.7 mm, for example. In yet another exemplary embodiment, the thickness t of the glass article 100 may be equal to or less than approximately 0.65 mm, for example. In yet another exemplary embodiment, the thickness t of the glass article 100 may be equal to or less than approximately 0.6 mm, for example. In yet another exemplary embodiment, the thickness t of the glass article 100 may be equal to or less than approximately 0.5 mm, for example. In yet another exemplary embodiment, the thickness t of the glass article 100 may be equal to or less than approximately 0.3 mm, for example. In some particular exemplary embodiments, the thickness t of the glass article 100 may be in the range of 0.45 mm to 0.8 mm or in the range of 0.5 mm to 0.75 mm, for example. It is, however, to be understood that the invention is not limited thereto. The glass article 100 may have the uniform thickness t or may have different thicknesses for different regions.

The glass article 100 may be tempered to have a predetermined stress profile therein. The tempered glass article 100 may better prevent cracks from occurring and propagating, breakage due to external impact, etc., compared to the glass article 100 before it is tempered. The glass article 100 tempered via a tempering process may have different stresses depending on its different regions. In an exemplary embodiment, compressive regions CSR1 and CSR2 where compressive stress acts may be disposed in the vicinity of the surfaces of the glass article 100, i.e., near the first surface US and the second surface RS, and a tensile region CTR where tensile stress acts may be disposed inside the glass article 100, for example. The boundary between the tensile region CTR and each of the compressive regions CSR1 and CSR2 may have the stress value of zero. The value of the compressive stress in each of the compressive regions CSR1 and CSR2 may vary depending on the position (i.e. depth from the surface). In addition, the tensile region CTR may also have different stress values depending on the depth from the surfaces US and RS.

The position of the compressive regions CSR1 and CSR2 in the glass article 100, the stress profile in the compressive regions CSR1 and CSR2, the compressive energy of the compressive regions CSR1 and CSR2, the tensile energy of the tensile region CTR, etc., may affect greatly on the mechanical properties of the glass article 100, such as surface strength. A detailed description thereon will be given later.

Hereinafter, the stress profile of the tempered glass article 100 will be described in detail.

Figure 4:
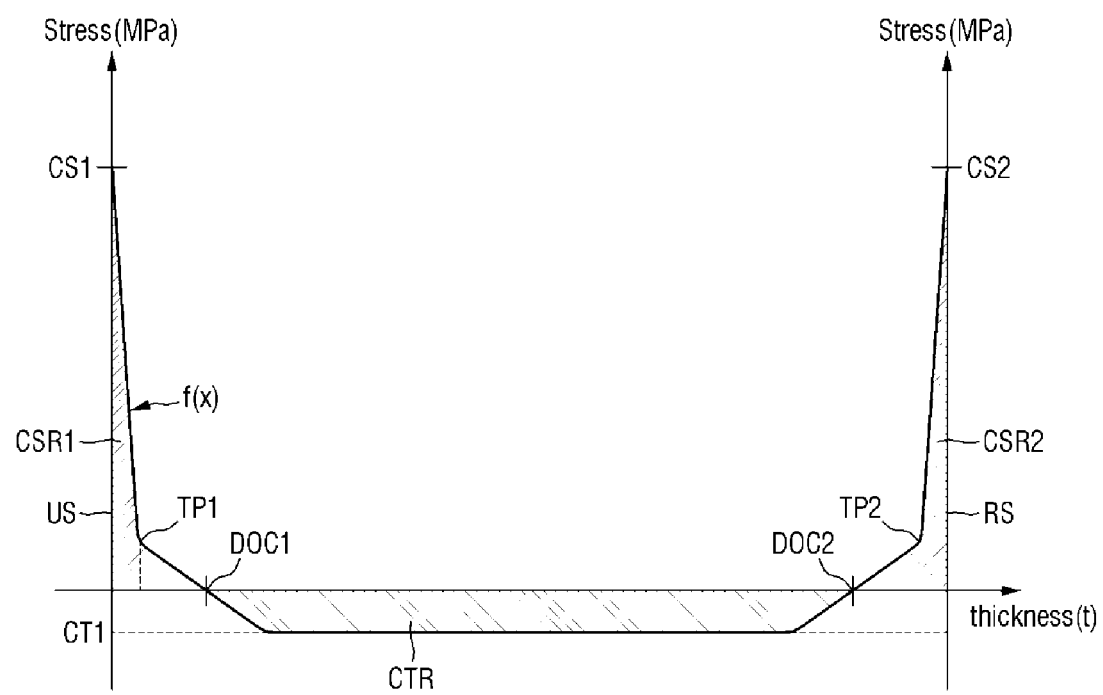
FIG. 4 is a graph showing the stress profile of an exemplary embodiment of a glass article according to the invention.

FIG. 4 is a graph showing an exemplary embodiment of a stress profile of the glass article 100 according to the invention. In the graph of FIG. 4, the x-axis represents the thickness direction of the glass article 100. In FIG. 4, the compressive stress has positive values, while the tensile stress has negative values. Herein, the magnitudes of the compressive/tensile stresses mean the absolute values regardless of their signs.

Referring to FIG. 4, the glass article 100 includes a first compressive region CSR1 that is extended (or expanded) from the first surface US to a first compression depth DOC1, and a second compressive region CSR2 that is extended (or expanded) from the second surface RS to a second compression depth DOC2. A tensile region CTR is disposed between the first compression depth DOL1 and the second compression depth DOL2. The stress profile on the first surface US and the stress profile on the second surface RS of the glass article 100 may be symmetrical with respect to the center of the thickness (t) direction. Although not shown in FIG. 4, compressive regions and a tensile region may be provided between the opposed side surfaces of the glass article 100 in a similar manner.

The first compressive region CSR1 and the second compressive region CSR2 are resistant to an external impact to prevent cracks in the glass article 100 or damage to the glass article 100. The larger the maximum compressive stresses CS1 and CS2 of the first compressive region CSR1 and the second compressive region CSR2 are, the higher the strength of the glass article 100 is. Since an external impact is usually transmitted through the surfaces of the glass article 100, it is advantageous to have the maximum compressive stresses CS1 and CS2 at the surfaces of the glass article 100 in terms of durability. In view of the above, the compressive stresses of the first compressive region CSR1 and the second compressive region CSR2 are the largest at the surfaces and generally decrease toward the inside.

The first compression depth DOC1 and the second compression depth DOC2 suppress cracks or grooves defined in the first surface US and the second surface RS from propagating to the tensile region CTR inside the glass article 100. The larger the first compression depth DOC1 and the second compression depth DOC2 are, the better the propagation of cracks and the like may be prevented. The positions of the first compression depth DOC1 and the second compression depth DOC2 are the boundaries between the tensile region CTR and each of the compressive regions CSR1 and CSR2, where the stress value is zero.

Throughout the glass article 100, the tensile stress of the tensile region CTR may be balanced with the compressive stresses of the compressive regions CSR1 and CSR2. That is to say, in the glass article 100, the sum of the compressive stresses (i.e., the compressive energies) may be equal to the sum of tensile stresses (i.e., the tensile energies). The stress energies accumulated in an area having a constant width in the thickness direction in the glass article 100 may be calculated by integrating the stress profile. When the stress profile in the glass article 100 having the thickness of t is represented by the function f(x), the following relationship may be established:

$$\int_0^t f(x)dx = 0 \quad \text{[Equation 1]}$$

The larger the tensile stress inside the glass article 100 is, the more likely the fragments to be vigorously released when the glass article 100 is broken, and the more likely the glass article 100 is to be crushed from the inside. In an exemplary embodiment, the maximum tensile stress that meets the frangibility requirements of the glass article 100 may satisfy the following relationship:

$$CT_1 \leq -38.7 \times \ln(t) + 48.2 \quad \text{[Inequality 2]}$$

In some exemplary embodiments, the maximum tensile stress $CT_1$ may be equal to or greater than 40 MPa or equal to or less than 70 MPa, for example. In order to improve mechanical properties such as strength, it may be desirable that the maximum tensile stress $CT_1$ is equal to or greater than 50 MPa, for example. According to an exemplary embodiment of the invention, the maximum tensile stress $CT_1$ may be, but is not limited to, above 40 MPa and below 70 Mpa, for example.

The maximum tensile stress $CT_1$ of the glass article 100 may be generally provided at the center portion of the glass article 100 in the thickness direction. In an exemplary embodiment, the maximum tensile stress $CT_1$ of the glass article 100 may be provided at a depth in the range of 0.4t to 0.6t, or in the range of 0.45t to 0.55t, or at a depth of approximately 0.5t, for example.

Although it is desired that the compressive stresses and the compression depths DOL1 and DOL2 have large values in order to increase the strength of the glass article 100, the tensile stress may also be increased as the tensile energy is increased with the compressive energy. In order to meet the frangibility requirements while having a high strength, it is desired to adjust the stress profile so that the maximum compressive stresses CS1 and CS2 and the compression depths DOL1 and DOL2 have large values while the compressive energy is reduced. To this end, the first compressive region CSR1 and the second compressive region CSR2 may respectively include a first transition point TP1 and a second transition point TP2 at which the slope of the stress profile changes rapidly. The shape of such a stress profile (particularly, the shape of the stress profile in the compressive regions) may be precisely adjusted by adjusting the process conditions of an ion exchange process.

The stress profile of the compressive regions will be described in detail with reference to FIG. 4. In the following description, the stress profile of the first compressive region CSR1 will be described. The stress profile in the first compressive region CSR1 and the stress profile in second compressive region CSR2 are symmetrical, and thus the stress profile in the second compressive region CSR2 will not be described.

Figure 5:
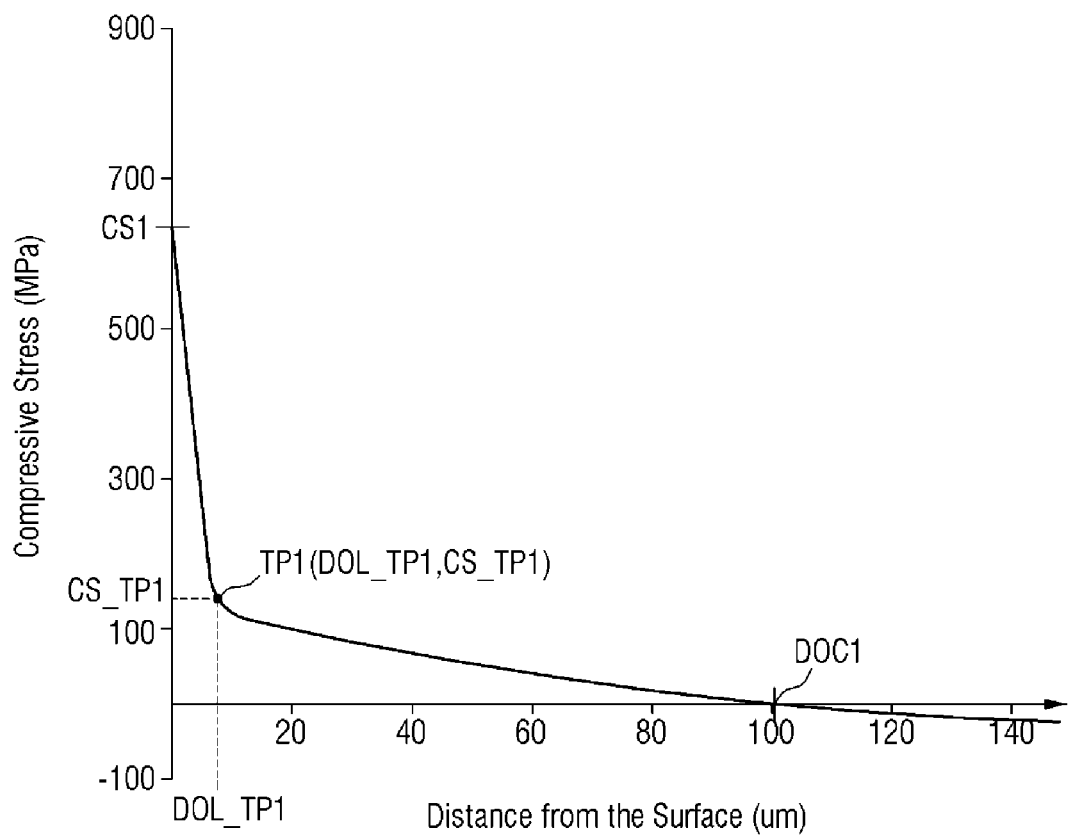
FIG. 5 is an enlarged graph showing the vicinity of the first compressive region of FIG. 4.
Figure 6:
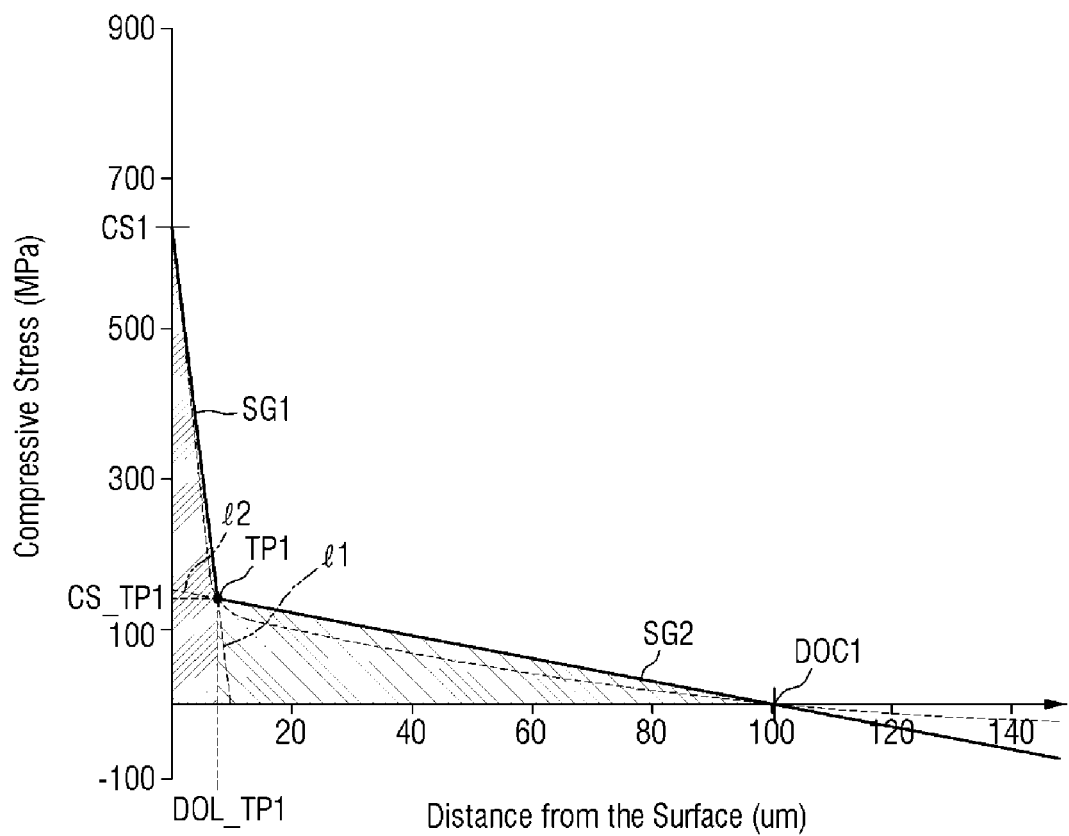
FIG. 6 is a schematic view showing a straight line to which the stress profile of FIG. 5 approximates.

FIG. 5 is an enlarged graph showing the vicinity of the first compressive region of FIG. 4. FIG. 6 is a schematic view showing a straight line to which the stress profile of FIG. 5 approximates.

Referring to FIGS. 5 and 6, the stress profile has a negative slope in the first compressive region CSR1, and the stress generally decreases from the first surface US to the first compression depth DOC1. In the first compressive region CSR1, the stress profile may include at least one first transition point TP1 (or inflection point) at which the slope changes drastically.

The first transition point TP1 may be provided between the first surface US and the first compression depth DOC1. The stress profile of the first compressive region CSR1 may be divided into a first segment SG1 and a second segment SG2 with respect to the first transition point TP1. That is to say, the stress profile of the first compressive region CSR1 may include the first segment SG1 extended from the first surface US to the first transition point TP1, and the second segment SG2 extended from the first transition point TP1 to the first compression depth DOC1.

The first segment SG1 and the second segment SG2 may be divided by the type of ions permeated thereinto. In an exemplary embodiment, potassium (K) ions permeate only into the depth corresponding to the first segment SG1 closer to the first surface US in the first compressive region CSR1, but may not permeate into the depth corresponding to the second segment SG2 provided more to the inside, for example. Sodium (Na) ions having a smaller ion size than potassium (K) ions may permeate not only into the depth corresponding to the first segment SG1 but also into the depth corresponding to the second segment SG2.

In the first compressive region CSR1, the stress of the first segment SG1 closer to the surface may be determined mainly by the density of potassium (K) ions. As mentioned earlier, although the first segment SG1 may include sodium (Na) ions as well, the stress thereof may depend mainly on the density of potassium (K) ions having larger ions. In the depth corresponding to the first segment SG1, the higher the density of the potassium (K) ions is, the higher the stress is, and the stress profile may generally approximate the density profile of the potassium (K) ions. The first transition point TP1, i.e., the boundary between the first segment SG1 and the second segment SG2 may be the maximum permeation depth of the potassium (K) ions.

In the first compressive region CSR1, the stress of the second segment SG2 provided more to the inside may be determined mainly by the density of sodium (Na) ions. Specifically, in the depth corresponding to the second segment SG2, the higher the density of the sodium (Na) ions is, the higher the stress is, and the stress profile may generally approximate the density profile of the sodium (Na) ions. The first compression depth DOC1 may be equal to the maximum permeation depth of sodium (Na) ions.

The first segment SG1 may generally approximate a first straight line l1 connecting the coordinates of the first transition point TP1 with the coordinates of the first surface US within that area. In a coordinate plane having depth as the x axis and stress as the y axis, the first straight line l1 may be expressed by a first function as shown in Equation 3 below:

$$y = m_1 x + a \quad \text{[Equation 3]}$$

where $m_1$ denotes a first slope of the first straight line l1, and a denotes the compressive stress at the first surface US, which is the y intercept. The first slope $m_1$ may mean the average slope of the first segment SG1. The first segment SG1 may generally have the first slope $m_1$.

The second segment SG2 may generally approximate a second straight line l2 connecting the coordinates of the first transition point TP1 with the coordinates of the first compression depth DOC1 where the stress is zero within that area. In the coordinate plane having depth as the x axis and stress as the y axis, the second straight line l2 may be expressed by a second function as shown in Equation 4 below:

$$y = m_2 x + b \quad \text{[Equation 4]}$$

where $m_2$ denotes a second slope of the second straight line l2, b denotes the y intercept, $-b/m_2$ denotes the x intercept, which is the first compression depth DOC1. In a portion of the tensile region CTR adjacent to the first compressive region CTR1, the stress profile may follow the second straight line l2. The second slope $m_2$ may mean the average slope of the second segment SG2. The second segment SG2 may generally have the second slope $m_2$.

In the above functions, the first slope $m_1$ and the second slope $m_2$ may have negative values, and the absolute value of the first slope $m_1$ of the first straight line l1 may be larger than the absolute value of the second slope $m_2$ of the second straight line l2.

The slope (or gradient) of the stress profile may change rapidly at the first transition point TP1. In FIG. 6, the first transition point TP1 is provided at the point where the first straight line l1 and the second straight line l2 meet. Practically, the second segment SG2 and the first segment SG1 are provided in a curve, and the first transition point TP1 may be an inflection point.

The first segment SG1 and the second segment SG2 having different slopes may be generated via a single-stage ion exchange process. In the ion exchange process, the second segment SG2 may be generated by introducing sodium (Na) ions, and the first segment SG1 may be generated by introducing potassium (K) ions. When the glass is produced via the single-stage ion exchange process, the difference between the slope of the first segment SG1 and the slope of the second segment SG2 may not be large in the stress profile. In this regard, by adjusting the ion exchange process conditions appropriately, it is possible to form a stress profile having a slope difference larger than a predetermined value. Hereinafter, the ion exchange process conditions will be described.

The ion exchange process is carried out by exposing the glass to a mixed molten salt including potassium (K) ions and sodium (Na) ions. In an exemplary embodiment, the glass is immersed in a bath comprising a mixed molten salt in which potassium nitrate and sodium nitrate are mixed for an ion exchange process, for example. In an exemplary embodiment, the ratio of sodium nitrate and potassium nitrate in the mixed molten salt may be adjusted in the range of, but is not limited to, 20:80 to 30:70, for example. In an exemplary embodiment, the ion exchange process may be carried out at a temperature of approximately 390 degrees Celsius (° C.) to approximately 410° C. for approximately one hour to two hours, for example.

The lithium (Li)/sodium (Na) ions in the glass are exchanged with sodium (Na)/potassium (K) ions, which are larger ions in the mixed molten salt, via the ion exchange process. As a result, concentrations of sodium (Na) ions and potassium (K) ions may be increased in the glass. In addition, since the mixed molten salt receives lithium (Li) ions from the glass, it may further include lithium (Li) ions after the ion exchange process, in addition to sodium (Na) ions and potassium (K) ions.

The degree of diffusion of ions may be inversely proportional to the size of the ions. In other words, ions having a smaller size may diffuse more. Therefore, when both sodium (Na) ions and potassium (K) ions permeate into the glass via the ion exchange process, sodium (Na) ions having a smaller size may diffuse more than potassium (K) ions so that sodium (Na) ions may permeate more deeply. Sodium (Na) ions may diffuse to the first compression depth DOC1, while potassium (K) ions may diffuse to a depth below the first transition point TP1.

In an exemplary embodiment of the invention, the ion exchange process is a single-stage process, and thus the process of determining the compression depths DOC1 and DOC2 and the process of determining the maximum compressive stresses CS1 and CS2 in the glass may occur simultaneously. The process of determining the compression depths DOC1 and DOC2 of the glass may be carried out by lithium (Li)-sodium (Na) ion exchange. Specifically, lithium (Li) ions in the glass may be discharged into the mixed molten salt, and sodium (Na) ions in the mixed molten salt may permeate into the glass.

As a result of the lithium (Li)-sodium (Na) ion exchange, a stress profile corresponding to the second straight line l2 may be obtained. That is to say, sodium (Na) ions of the mixed molten salt may be exchanged into the glass to permeate therein and then diffuse in the depth direction. The sodium (Na) ions generally diffuse to the first compression depth DOC1 to form the first compressive region CSR1 having a compressive stress from the first surface US to the first compression depth DOC1. The first compression depth DOC1 may be determined by the lithium (Li)-sodium (Na) ion exchange.

The density of ions by diffusion is generally inversely proportional to the diffusion distance. Sodium (Na) ions enter the glass through ion exchange from the surface of the glass and diffuse in the depth direction. Accordingly, the concentration of sodium (Na) ions generally tends to decrease linearly away from the glass first surface US of the glass. Accordingly, the stress profile is the largest on the first surface US1 of the glass and decreases in the depth direction, like the second straight line l2.

As such, the first compression depth DOC1 is closely correlated with the maximum diffusion depth of the exchanged sodium (Na) ions. The first compression depth DOC1 may be equal to the maximum diffusion depth of sodium (Na) ions, or may be provided in the vicinity thereof even though there is a slight difference, and may be generally proportional to the maximum diffusion depth of sodium (Na) ions. As such, lithium (Li)-sodium (Na) ion exchange may form a predetermined first compression depth DOC1 by sufficient diffusion.

The more ions diffuse, the smaller the maximum compressive stress CS1 may be. The maximum compressive stress CS1 increases with the density of ions. Accordingly, when the same amount of ions entered the glass, the density decreases as the ions diffuse more so that the compressive stress may decrease. Sodium (Na) ions have smaller size and diffuse more into the glass. Accordingly, they may not increase the maximum compressive stress CS1 of the first surface US sufficiently. A larger maximum compressive stress (also referred to as "surface compressive stress") CS1 may be achieved by potassium (K) ions.

The process of determining the maximum compressive stress CS1 of the first surface US of the glass article 100 may be accomplished by lithium (Li)-potassium (K) and/or sodium (Na)-potassium (K) ion exchange. Specifically, lithium (Li) and/or sodium (Na) ions in the glass may be discharged into the mixed molten salt, and potassium (K) ions in the mixed molten salt may permeate into the glass.

As a result of the lithium (Li)-potassium (K) and/or sodium (Na)-potassium (K) ion exchange during the ion exchange process, a stress profile corresponding to the first straight line l1 may be provided. That is to say, after the potassium (K) ions of the mixed molten salt are exchanged and permeate into the glass, it may diffuse in the depth direction. Potassium (K) ions may generally diffuse to the first transition point TP1 to greatly increase the compressive stress of the first segment SG1 near the surface US of the glass. When potassium (K) ions permeate into the glass, the compressive stress at that portion may increase by the potassium (K) ions having a larger size. Potassium (K) ions that permeate into the glass diffuse in the depth direction. Since potassium (K) ions diffuse more slowly than sodium (Na) ions, the depth at which potassium (K) ions diffuse via the ion exchange process is much shorter than the first compression depth DOC1. As described above, the maximum diffusion depth of the potassium (K) ions may be equal to or less than the first transition point TP1.

The stress profile provided by the potassium (K) ions permeating via the ion exchange process may have a shape generally conforming to the first straight line l1. The compressive stress CS1 of the first surface US provided by the potassium (K) ions becomes large while the permeation depth (or the first transition point TP1) of the potassium (K) ions is smaller than the first compression depth DOC1. Accordingly, the absolute value of the first slope $m_1$ of the first straight line l1 may be greater than the absolute value of the second slope $m_2$ of the second straight line l2. That is to say, the compressive stress profile has a sharp slope near the surface of the glass article 100, and the slope may be gentler toward the inside of the glass article 100.

The absolute value of the first slope $m_1$ may have a value in the range of approximately 20 to approximately 65 in one exemplary embodiment, it may have a value in the range of approximately 25 to approximately 60 in another exemplary embodiment, and it may have a value in the range of approximately 33.2 to approximately 54.6 in yet another exemplary embodiment. It is, however, to be understood that the invention is not limited thereto. The absolute value of the second slope $m_2$ may have a value in the range of approximately 0.5 to approximately 4 in one exemplary embodiment, may have a value in the range of approximately 1 to approximately 3.5 in another exemplary embodiment, and may have a value in the range of approximately 1.5 to approximately 2.9 in yet another exemplary embodiment. It is, however, to be understood that the invention is not limited thereto.

The stress profile in the first compressive region CSR1 as described above may have at least three main feature points.

The first feature point corresponds to the y intercept of the second straight line l2 and is provided on the first surface US. The second feature point is the x intercept of the first straight line l1, which is the first compression depth DOC1. The third feature point is provided at the first transition point TP1. The above-described locations of the feature points are factors that substantially determine the stress profile. Since the profile between the first feature point and the third feature point approximates the first straight line l1, and the profile between the second feature point and the third feature point approximates the second straight line l2, the shape of the stress profile may also be determined once the first feature point, the second feature point, and the third feature point are determined.

The first feature point is provided on the first surface US, and its x coordinate value is zero and its y coordinate value corresponds to the maximum compressive stress CS1. The maximum compressive stress CS1 represented by the first feature point may be related to the strength of the glass article 100. As the maximum compressive stress CS1 is larger, it is possible to prevent cracks caused by external impacts. The maximum compressive stress CS1 is determined by how much potassium (K) ions are exchanged during the ion exchange process, and may be somewhat associated with the degree of diffusion after the ion exchange.

In an exemplary embodiment, the maximum compressive stress CS1 may be equal to or greater than 300 MPa, for example In exemplary embodiments, the maximum compressive stress CS1 may be at least 350 MPa, at least 400 MPa, or at least 450 MPa, for example. In addition, the maximum compressive stress CS1 may be equal to or less than 1,000 MPa, for example. In exemplary embodiments, the maximum compressive stress CS1 may be equal to or less than 850 MPa, equal to or less than 750 MPa, or equal to or less than 650 MPa, for example. In some exemplary embodiments, the maximum compressive stress CS1 may be in the range of 450 MPa to 650 MPa, for example.

The second feature point is a point where the stress value is zero, and its y coordinate value is zero and its x coordinate value corresponds to the first compression depth DOC1. The first compression depth DOC1 represented by the second feature point corresponds to the size (or width) of the first compressive region CSR1 of the glass articles 100. It may be advantageous to prevent cracks from propagating to the tensile region CTR as the first compression depth DOC1 increases. In view of the above, the first compression depth DOC1 (i.e., the distance from the first surface US to the first compression depth DOC1) may be equal to or greater than 50 μm, equal to or greater than 65 μm, equal to or greater than 80 μm, or equal to or greater than 90 μm. It is to be noted that, when the first compression depth DOC1 is too large, the compressive energy and the tensile energy may become too large to satisfy the fragility criterion. In view of the above, the first compression depth DOC1 may be equal to or less than 250 μm, equal to or less than 200 μm, equal to or less than 180 μm, equal to or less than 150 μm, or equal to or less than 120 μm. In a preferred exemplary embodiment, the first compression depth DOC1 may have, but is not limited to, a range of 90 μm to 120 μm. The first compression depth DOC1 may be controlled by the diffusion degree of sodium (Na) ions during the ion exchange process.

The first compression depth DOC1 may be equal to or greater than 0.1t, equal to or greater than 0.15t, or equal to or greater than 0.18t with respect to the thickness t of the glass. In addition, the first compression depth DOC1 may be equal to or less than 0.25t, equal to or less than 0.23t, or equal to or less than 0.2t with respect to the thickness t of the glass.

The third feature point is provided at a predetermined depth and has a predetermined stress value. The first transition point TP1 represented by the third feature point is deeply associated with the first slope $m_1$ of the first segment SG1 and the second slope $m_2$ of the second segment SG2. The first slope $m_1$ may be determined by the exchange and/or diffusion of sodium (Na) ions, and the second slope $m_2$ may be determined by the exchange and/or diffusion of potassium (K) ions.

The x coordinate value (depth) of the first transition point TP1 may have a value greater than zero and less than the first compression depth DOC1, and the y coordinate value (stress) thereof may have a value greater than zero and less than the maximum compressive stress CS1. According to the example of the first compression depth DOC1 and the maximum compressive stress CS1 described above, the stress-depth of the first transition point TP1 may be greater than zero and less than 90 micrometers (μm), and the stress thereof may be greater than zero and less than 450 MPa, for example. As such, the location of the first transition point TP1 may determine the general shape of the stress profile in the first compressive region CSR1. In addition, the position of the first transition point TP1 may determine the area of the first compressive region CSR1, i.e., the magnitude of the compressive energy.

When the depth DOL_TP1 of the first transition point TP1 is too large, the fabricating cost may increase, the compressive energy may be excessively large, or mechanical properties such as strength may be weakened. When the depth DOL_TP1 of the first transition point TP1 is too small, the area capable of strongly preventing the propagation of cracks transmitted by strong impact may be reduced. In view of the above, the depth DOL_TP1 of the first transition point TP1 may have a value from approximately 12 μm to approximately 20 μm in an exemplary embodiment, may have a value from approximately 10 μm to approximately 18 μm in another exemplary embodiment, and may have a value from approximately 7 μm to approximately 15 μm in yet another exemplary embodiment. It is, however, to be understood that the invention is not limited thereto.

The ratio of the depth DOL_TP1 of the first transition point TP1 to the first compression depth DOC1 may have a value in the range of 0.058 to 0.17 in an exemplary embodiment, and may have a value in the range of approximately 0.077 to approximately 0.125 in another exemplary embodiment. The depth DOL_TP1 of the first transition point TP1 may be in the range of 0.010t to 0.015t or in the range of 0.011t to 0.014t with respect to the thickness t of the glass.

When the stress CS_TP1 at the first transition point TP1 is too large, the compressive energy increases or the depth of the first transition point TP1 becomes small, making it difficult to prevent crack propagation. When the stress CS_TP1 at the first transition point TP1 is too small, the strength may be too small. In this regard, in an exemplary embodiment of the invention, the stress CS_TP1 of the first transition point TP1 may be in the range of 100 MPa to 220 MPa, for example. In another exemplary embodiment, the stress CS_TP1 of the first transition point TP1 may be in the range of 180 MPa to 230 MPa, for example. In yet another exemplary embodiment, the stress CS_TP1 of the first transition point TP1 may be in the range of 200 MPa to 210 MPa, for example. The ratio of the stress CS_TP1 at the first transition point TP1 to the maximum compressive stress CS1 may be, but is not limited to, in the range of 0.22 to 0.47 or in the range of 0.3 to 0.4, for example.

In addition to the depth DOL_TP1 and the stress CS_TP1 of the first transition point TP1, the ratio of the stress CS_TP1 to the depth DOL_TP1 of the first transition point TP1 (hereinafter referred to as stress-depth ratio CDR) may be a major factor in determining the ratio of the compressive energy of the segments SG1 and SG2 (that is, the value of integrating the segments) in the stress profile.

Figure 7:
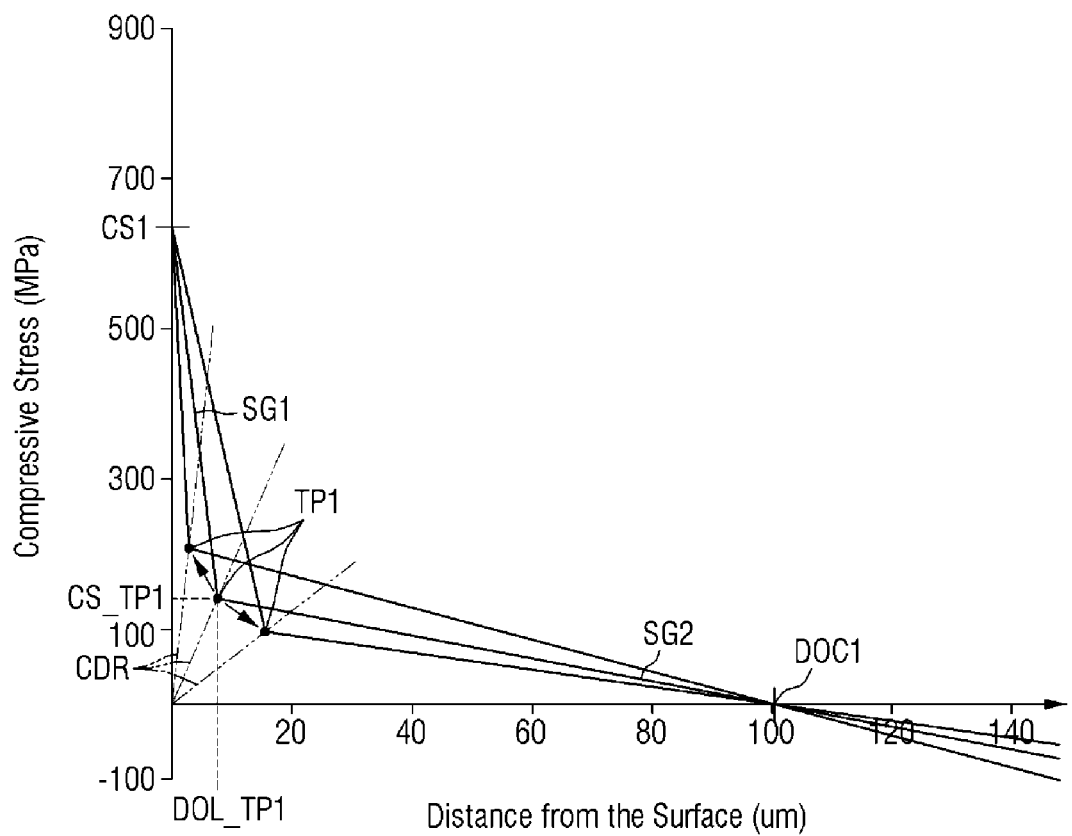
FIG. 7 is a graph schematically showing different stress profiles depending on different stress-depth ratios of the first transition point.

FIG. 7 is a graph schematically showing different stress profiles depending on different stress-depth ratios of the first transition point. Referring to FIGS. 5, 6 and 7, as the stress-depth ratio CDR of the first transition point TP1 increases, the depth DOL_TP1 of the first transition point TP1 decreases relatively, and the stress CS_TP1 of the first transition point TP1 increases relatively. In addition, the first compressive energy (or surface compressive energy) by the first segment SG1 becomes relatively small, while the first compressive energy by the second segment SG2 (or internal compressive energy) becomes relatively large. The stress-depth ratio CDR of the first transition point TP1 decreases, the opposite tendency is shown.

According to the test results, when the depth DOL_TP1 of the first transition point TP1 is in the range of 7 μm to 15 μm and the stress CS_TP1 of the first transition point TP1 is in the range of 100 MPa to 220 Mpa, mechanical properties such as strength are improved as the stress-depth ratio CDR of the first transition point TP1 increases. When the stress-depth ratio CDR of the first transition point TP1 is equal to or greater than 8 megapascals per micrometer (MPa/μm), a significant strength improvement may be exhibited in a glass impact test ("GIT"). When the stress-depth ratio CDR of the first transition point TP1 is too large, the depth DOL_TP1 of the first transition point TP1 becomes smaller and the area of the first segment SG1 becomes too narrow. It is very difficult to precisely form such a stress profile, and thus there may be a lot of variations among products. In addition, when the stress-depth ratio CDR of the first transition point TP1 is too large, the area that may strongly prevent the propagation of cracks transmitted by a strong impact is reduced, and the second compressive energy is further increased, to increase the overall compressive energy and tensile energy excessively. In view of the above, it is desired that the stress-depth ratio CDR of the first transition point TP1 is adjusted to be below approximately 30 MPa/μm.

Figure 8:
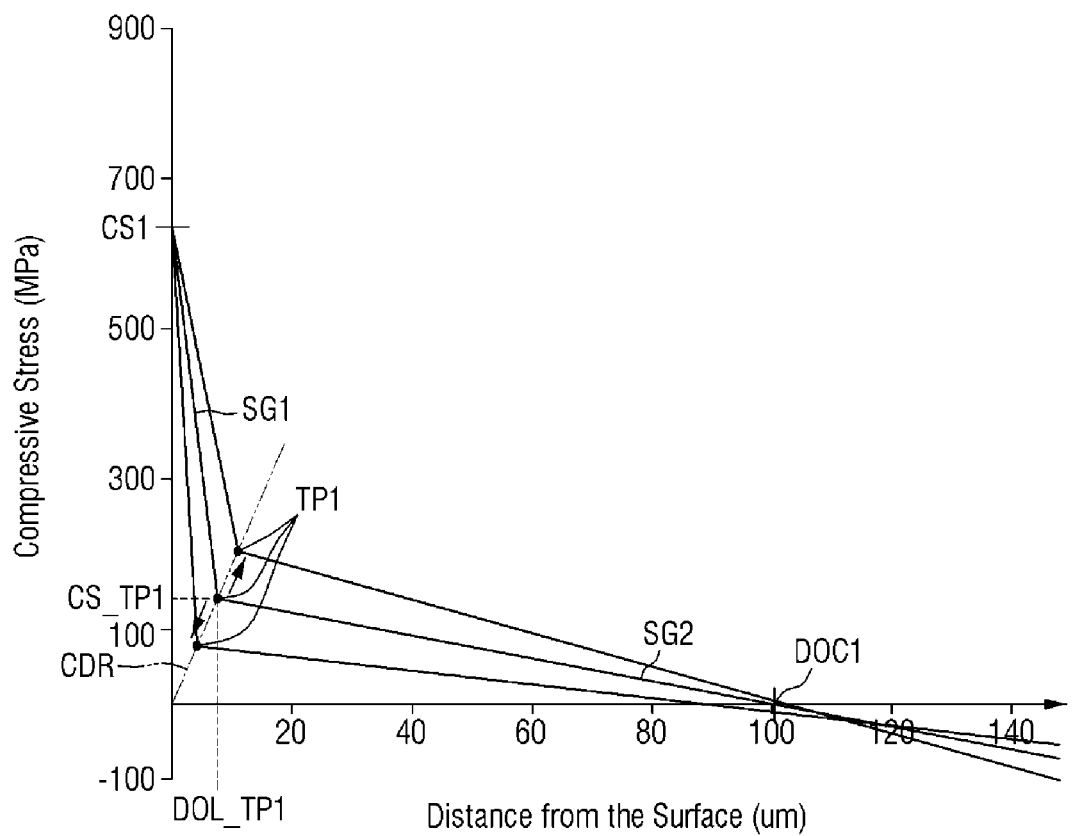
FIG. 8 is a graph schematically showing stress profiles having different compressive energies with the same stress-depth ratio of the first transition point.

FIG. 8 is a graph schematically showing stress profiles having different compressive energies with the same stress-depth ratio of the first transition point.

Referring to FIGS. 5 to 8, even when the first feature point, i.e., the maximum compressive stress CS1 and the second feature point, i.e., the first compression depth DOC1 are fixed and the third feature point, i.e., the stress-depth ratio CDR of the first transition point TP1 has a predetermined value, the compressive energy and the tensile energy may vary depending on the actual coordinates of the first transition point TP1. When both the stress CS_TP1 and the depth DOL_TP1 of the first transition point TP1 increase with the same stress-depth ratio CDR, the stress profile is placed relatively above and the area thereunder increases so that the compressive energy and tensile energy increase. When the compressive energy is somewhat increased, the mechanical properties may be improved. When the tensile energy is increased too much, the glass article 100 may fail to satisfy the fragility requirements.

The compressive stress, the first compression depth DOC1, the tensile stress, the first transition point TP1, etc., may be measured by a surface stress meter ("FSM") and/or a scattered light photoelastic stress meter. Specifically, the first segment SG1 associated with the surface compressive stress CS1 and the first transition point TP1 may be measured by an FSM such as FSM-6000 available from Orihara Industrial Co., Ltd. in Japan. The FSM may measure the density of potassium (K) ions in the glass article 100. Thus, by measuring the density of potassium (K) ions from the first surface US of the glass article 100 to the first transition point TP1, which is the maximum permeation depth of potassium (K) ions, it is possible to estimate the first segments SG1 of the stress profile.

Tensile stress may be measured by a scattered light photoelastic stress meter such as SLP-1000 available from Orihara Industrial Co., Ltd. The scattered light photoelastic stress meter may measure the stress layer depth inside glass using laser and scattered light photoelastic analysis technology to measure the stress inside the glass article 100. It is mainly used to measure the tensile stress in the tensile region CTR. The tensile stress is the largest at the center of the glass article 100 and becomes zero at the first compression depth DOC1. Therefore, the point where the stress value measured by the scattered light photoelastic stress meter is zero is estimated as the first compression depth DOC1, and the second segment SG2 may be estimated by connecting the first transition point TP1 with the first compression depth DOC1.

It is to be understood that the way of measuring the stress profile is not limited to that described above, and various other equipment and other methods known in the art may be employed.

Figure 9:
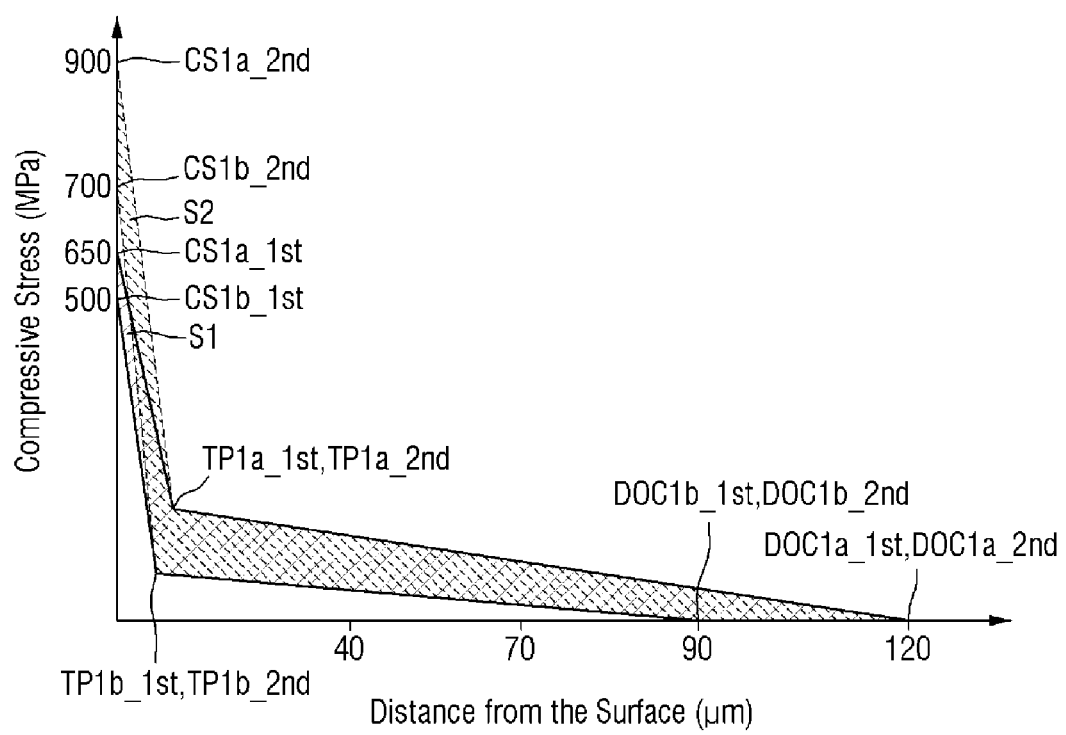
FIG. 9 is a graph schematically showing straight lines that stress profiles of glass produced via a single-stage tempering process and glass produced via a two-stage tempering process approximate.

FIG. 9 is a graph schematically showing straight lines that stress profiles of glass produced via a single-stage tempering process and glass produced via a two-stage tempering process approximate.

The glass produced via the single-stage tempering process is subjected to an ion exchange process with a mixed molten salt of sodium nitrate and potassium nitrate having a mole fraction of sodium cations of 20 mol % to 30 mol % at 390° C. to 410° C. for 1 or 2 hours, for example. The glass produced via the two-stage tempering process, after the signal-stage tempering process, is subjected to an additional ion exchange process with a mixed molten salt of sodium nitrate and potassium nitrate having 90 mol % to 99 mol % of potassium ions and 1 mol % to 10 mol % of sodium ions at approximately 370° C. to 390° C. for approximately 30 to 120 minutes.

Referring to FIG. 9, each of the stress profiles of the glass produced via the single-stage tempering process and the two-stage tempering process may include the above-described three feature points, i.e., the first compression depth DOC1, the maximum compressive stress CS1, and the first transition point TP1.

When the glass article 100 produced via the single-stage tempering process is compared to the glass article 100 produced via the two-stage tempering process, the compression depth and the compressive stress at the first transition point TP1 may have substantially the same values. The first compression depth DOC1 of the glass article 100 produced via the single-stage tempering process may have substantially the same value as the first compression depth DOC1 of the glass article 100 produced via the two-stage tempering process. The maximum compressive stress CS1 of the glass article 100 produced via the two-stage tempering process may have, but is not limited to, a value greater than the maximum compressive stress CS1 of the glass article 100 produced via the single-stage tempering process. That is to say, when the additional ion exchange process is performed as described above, the first compression depth DOC1 and the first transition point TP1 may not change substantially, but the maximum compressive stress CS1 may increase. It is, however, to be understood that the invention is not limited thereto.

Specifically, the glass articles 100 produced via the single-stage tempering process may have the first compression depth DOC1 of approximately 90 μm to approximately 120 μm, the compression depth at the first transition point TP1 of approximately 7 μm to approximately 15 um, and the compressive stress of approximately 100 MPa to approximately 220 MPa, for example. The maximum compressive stress CS1 of the glass articles 100 produced via the single-stage tempering process may have a value approximately from 450 MPa to 650 MPa, and the maximum compressive stress CS1 of the glass articles 100 produced via the two-stage tempering process may have a value approximately from 750 MPa to 900 MPa, for example.

Area S1 of the glass article 100 produced via the single-stage tempering process shown in FIG. 9 may be defined by the stress profile line connecting the upper limit CS1$a$_1st of the maximum compressive stress, the first transition point TP1$a$_1st having the upper limits of the compression depth and the compressive stress, and the upper limit DOC1$a$_1st of the first compression depth, the stress profile line connecting the lower limit CS1$b$_1st of the maximum compressive stress, the first transition point TP1$b$_1st having the compression depth and the lower limit of the compressive stress, and the lower limit DOC1$b$_1st of the first compression depth, the x-axis, and the y-axis.

The stress profile of the glass article 100 produced via the single-stage tempering process with a mixed molten salt of sodium nitrate and potassium nitrate having a mole fraction of sodium cations of 20 mol % to 30 mol % at 390° C. to 410° C. for 1 or 2 hours may pass through the upper limit point CS1$a$_1st of the first feature point, the upper limit DOC1$a$_1st of the second feature point, and the upper limit point TP1$a$_1st of the third feature point. The stress profile may continuously change toward the lower limit CS1$b$_1st of the first feature point, the lower limit DOC1$b$_1st of the second feature point, and the lower limit point TP1$b$_1st of the third feature point from the feature points, respectively. The stress profile of the glass article 100 produced via the single-stage tempering process may be provided in the area S1 under the above conditions.

Area S2 of the glass article 100 produced via the two-stage tempering process shown in FIG. 9 may be defined by the stress profile line connecting the upper limit CS1$a$_2nd of the maximum compressive stress, the first transition point TP1$a$_2nd having the upper limits of the compression depth and the compressive stress, and the upper limit DOC1$a$_2nd of the first compression depth, the stress profile line connecting the lower limit CS1$b$_2nd of the maximum compressive stress, the first transition point TP1$b$_2nd having the compression depth and the lower limit of the compressive stress, and the lower limit DOC1$b$_2nd of the first compression depth, the x-axis, and the y-axis.

The stress profile of the glass article 100, after the single-stage tempering process under the above conditions, produced via the two-stage tempering process with a mixed molten salt of sodium nitrate and potassium nitrate having 90 mol % to 95 mol % of potassium ions and 5 mol % to 10 mol % of sodium ions at approximately 370° C. to 390° C. for approximately 30 to 120 minutes may pass through the upper limit point CS1$a$_2nd of the first feature point, the upper limit DOC1$a$_2nd of the second feature point, and the upper limit point TP1$a$_2nd of the third feature point. The stress profile may continuously change toward the lower limit CS1$b$_2nd of the first feature point, the lower limit DOC1$b$_2nd of the second feature point, and the lower limit point TP1$b$_2nd of the third feature point from the feature points, respectively. Specifically, the first feature point may have a value between the upper limit point CS1$a$_2nd of the first feature point and the lower limit point CS1$b$_2nd of the first feature point, the second feature point may have a value between the upper limit point DOC1$a$_2nd of the second feature point and the lower limit point DOC1$b$_2nd of the second feature point, and the third feature may have a value between the upper limit TP1$a$_2nd of the third feature and the lower limit point TP1$b$_2nd of the third feature point. It is, however, to be understood that the invention is not limited thereto. The stress profile of the glass article 100 produced via the two-stage tempering process may be provided in the area S2 under the above conditions.

Comparing the glass article 100 produced via the single-stage tempering process with the glass article 100 produced via the two-stage tempering process, there may be no difference in the first compression depth DOC1 or the first transition point TP1, but there may be a significant difference in the maximum compressive stress CS1.

The glass article 100 in the exemplary embodiment of the invention may have a high strength such that it is not easily broken by an external impact. In addition, it is produced via the single-stage tempering process so that the time desired for tempering may be reduced and the cost may be saved.

Figure 10:
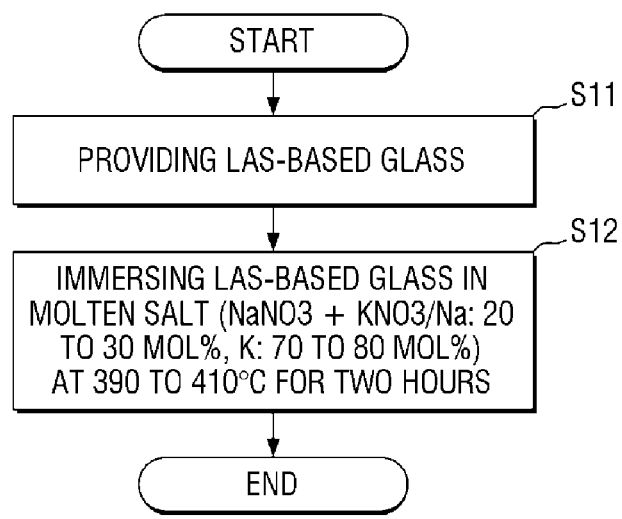
FIG. 10 is a flowchart for illustrating an exemplary embodiment of a method for producing the glass article according to the invention.
Figure 11:
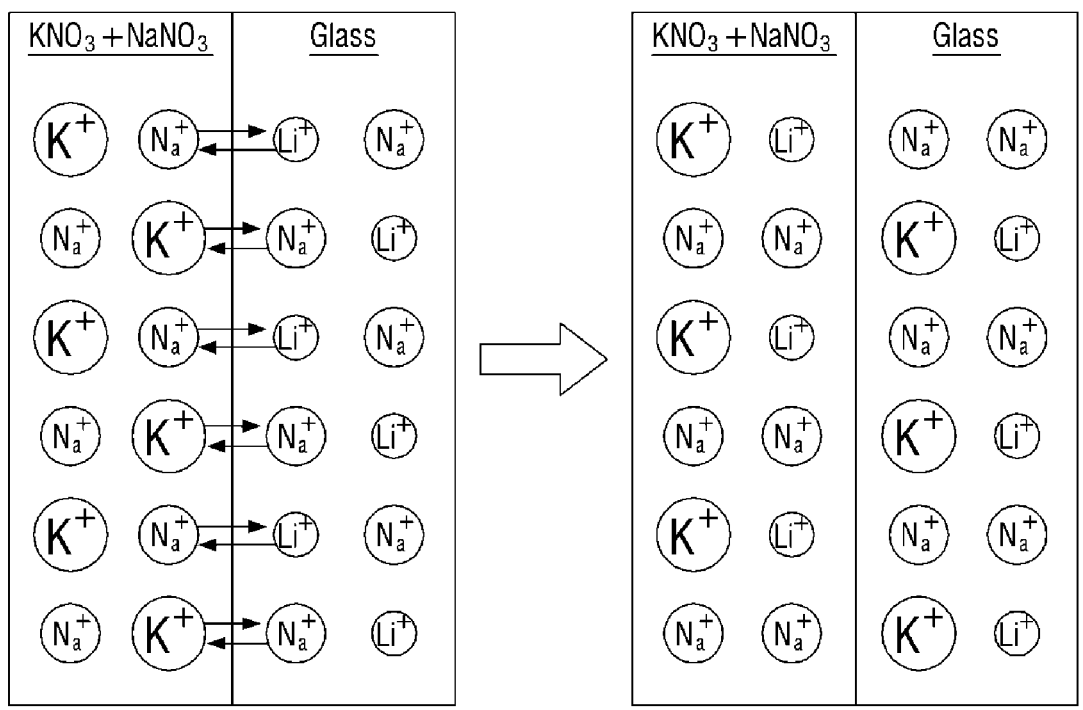
FIG. 11 is a view illustrating an exemplary embodiment of an ion exchange process according to the invention.

FIG. 10 is a flowchart for illustrating an exemplary embodiment of a method for producing the glass article 100 according to the invention. FIG. 11 is a view illustrating an exemplary embodiment of an ion exchange process according to the invention.

Referring to FIGS. 10 and 11, the method for producing the glass article 100 in an exemplary embodiment of the invention may include providing a LAS-based glass (operation S11), and immersing the LAS-based glass in a molten salt (NaNO3+KNO3/Na: 20 to 30 mol %, K: 70 to 80 mol %) at a temperature of 390° C. to 410° C. for one hour to two hours to temper it (operation S12).

The operation S11 of preparing the LAS-based glass may include preparing a glass composition and molding the glass composition.

The glass compositions may include a variety of compositions known in the art. In an exemplary embodiment of the invention, the glass composition may include LAS glass ceramics including lithium alumino-silicate. In an exemplary embodiment, the glass composition may include 50 to 80 mol % of $SiO_2$, 1 to 30 mol % of $Al_2O_3$, 0 to 5 mol % of $B_2O_3$, 0 to 4 mol % of $P_2O_5$, 3 to 20 mol % $Li_2O$, 0 to 20 mol % $Na_2O$, 0 to 10 mol % of $K_2O$, 3 to 20 mol % of MgO, 0 to 20 mol % of CaO, 0 to 20 mol % of SrO, 0 to 15 mol % of BaO, 0 to 10 mol % of ZnO, 0 to 1 mol % of $TiO_2$, 0 to 8 mol % of $ZrO_2$.

As used herein, the content of 0 mol % of a particular component refers to that the component is substantially not included. As used herein, a phrase "a composition substantially does not comprise a particular component" refers to that the component is intended not to be included in a raw material or the like, and a small amount of impurities equal to or less than 0.1 mol % may be inevitably included.

The glass composition may further include components such as $Y_2O_3$, $La_2O_3$, $Nb_2O_5$, $Ta_2O_5$ and $Gd_2O_3$ as desired, in addition to the components listed above. The composition of the glass article 100 may be changed through a molding process, an ion exchange process, etc., which will be described later.

The glass composition described above may be molded into a plate glass shape by various methods known in the art. In an exemplary embodiment, it may be molded by a float process, a fusion draw process, a slot draw process, etc.

In the operation S12 of immersing the LAS-based glass in the molten salt ($NaNO_3$+$KNO_3$/Na: 20 to 30 mol %, K: 70 to 80 mol %) at 390° C. to 410° C. for 1 to 2 hours, an ion exchange process may be performed. Specifically, the molten salt used in the operation S12 may be a mixed molten salt of sodium nitrate and potassium nitrate in which a mole fraction of sodium cations ranges from 20 mol % to 30 mol % and a mole fraction of potassium cations ranges from 70 mol % to 80 mol %, for example.

The ion exchange process refers to a process of exchanging ions in the glass articles 100 with other ions. The ion exchange process allows ions on or near the surface of the glass to be replaced or exchanged by larger ions having the same valence or oxidation state. In an exemplary embodiment, when the glass article 100 includes a monovalent alkali metal such as Li+, Na+, K+ and Rb+, the monovalent cations on the surface may be replaced by Na+, K+, Rb+, or Cs+ ions with larger ionic radius, for example. The ion exchange process will be described in more detail with reference to FIG. 11.

FIG. 11 is a view illustrating an exemplary embodiment of an ion exchange process according to the invention. In the example shown in FIG. 11, sodium (Na) ions in the glass are exchanged with potassium (K) ions.

Referring to FIG. 11, the glass including lithium and sodium (Na) ions is immersed in a mixed molten salt including sodium nitrate (Na) and potassium nitrate (K) so that it is exposed to sodium (Na) and/or potassium (K) ions. Then, lithium and/or sodium (Na) ions in the glass are discharged to the outside and sodium (Na) and/or potassium (K) ions may be replaced in place. The exchanged sodium (Na) and/or potassium (K) ions generate compressive stress because the ion radius is larger than that of lithium and/or sodium (Na) ions. The greater the amounts of exchanged sodium (Na) and/or potassium (K) ions, the greater the compressive stress. The ions are exchanged through the surfaces of the glass, the amounts of sodium (Na) and/or potassium (K) ions exchanged may be the largest at the surfaces of the glass article 100. Some of the exchanged sodium (Na) and/or potassium (K) ions may diffuse into the glass to increase the depth of the compressive region, i.e., the depth of the compression, but the amounts may decrease from the surface. Thus, the glass may have the stress profile that has the greatest compressive stress on the surface and decreases toward the inside. However, the invention is not limited to the above examples. The stress profile may be altered depending on the temperature, time and the number of the ion exchange process, whether heat treatment is carried out, etc.

According to the method of producing the glass article 100 in the exemplary embodiment of the invention, it is possible to shorten the time desired for tempering as it is performed via the single-stage tempering process, and it is possible to reduce the cost.

FIGS. 12 to 15 are graphs showing stress profiles of glass articles subjected to ion exchange processes with a mixed molten salt of sodium nitrate and potassium nitrate having a mole fraction of sodium cations of 20 mol % or 30 mol % at 390° C. or 410° C. for 1 hour or 2 hours.

As described above, the maximum compressive stress CS1, the stress CS_TP1 and the compression depth DOL_TP1 at the first transition point TP1, the first compression depth DOC1 of the glass articles 100 subjected to the ion exchange process under different conditions are listed in Table 1 below:

TABLE 1

| | Temperature | | | | | | | |
|---|---|---|---|---|---|---|---|---|
| | 390° C. | | | | 410° C. | | | |
| | Na+ Mole Fraction | | | | | | | |
| | 20 mol % | | 30 mol % | | 20 mol % | | 30 mol % | |
| Time | 1 hr | 2 hr | 1 hr | 2 hr | 1 hr | 2 hr | 1 hr | 2 hr |
| CS1 (MPa) | 635 | 655 | 588 | 591 | 623 | 622 | 565 | 572 |
| CS_TP1 (MPa) | 140.3 | 145.7 | 151.4 | 219.7 | 148 | 291.8 | 216 | 152.7 |
| DOL_TP1 (μm) | 9.7 | 13.3 | 9.7 | 8.6 | 8.7 | 7.2 | 8.3 | 12.6 |
| DOC1 (μm) | 102.4 | 107.3 | 103.2 | 110.6 | 95.7 | 108.1 | 95.2 | 114.2 |

Figure 12:
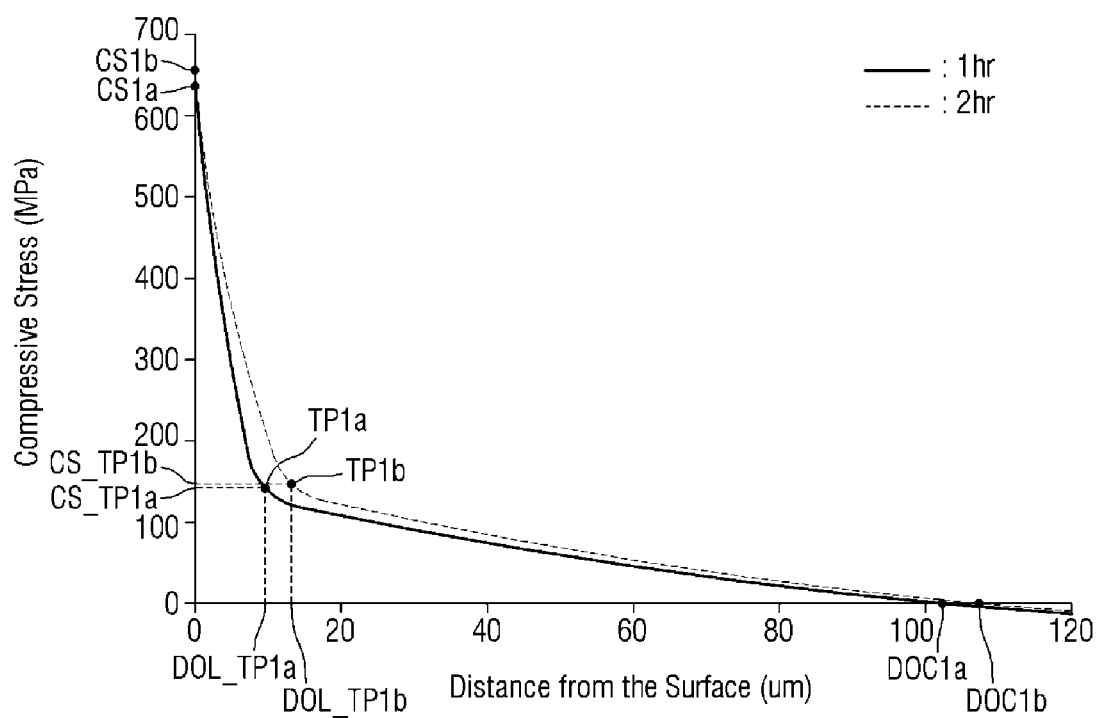
FIGS. 12 to 15 are graphs showing stress profiles of glass articles subjected to ion exchange processes with a mixed molten salt having a mole fraction of sodium cations of 20 mol % to 30 mol % at 390 degrees Celsius (° C.) to 410° C. for 1 hour or 2 hours.

Specifically, FIG. 12 is a graph showing a stress profile of a glass article subjected to an ion exchange process with a mixed molten salt of sodium nitrate and potassium nitrate having a mole fraction of sodium cations of 20 mol % at 390° C. for 1 hour or 2 hours, for example.

It may be seen from FIG. 12 that the maximum compressive stress CS1 of the glass article 100 subjected to an ion exchange process for two hours had a larger value than that of the glass article 100 subjected to the ion exchange process for one hour (refer to CS1a and CS1b). The first compression depth DOC1 of the glass article 100 subjected to the ion exchange process for two hours had a larger value than that of the glass article 100 subjected to the ion exchange process for one hour (refer to DOC1a and DOC1b). The compression depth DOL_TP1 at the first transition point TP1 of the glass article 100 subjected to the ion exchange process for two hours had a larger value than that of the glass article 100 subjected to the ion exchange process for one hour (refer to DOL_TP1a corresponding to TP1a and DOL_TP1b corresponding to TP1b). The compressive stress CS_TP1 at the first transition point TP1 of the glass article 100 subjected to the ion exchange process for two hours had a larger value than that of the glass article 100 subjected to the ion exchange process for one hour (refer to CS_TP1a corresponding to TP1a and CS_TP1b corresponding to TP1b).

Figure 13:
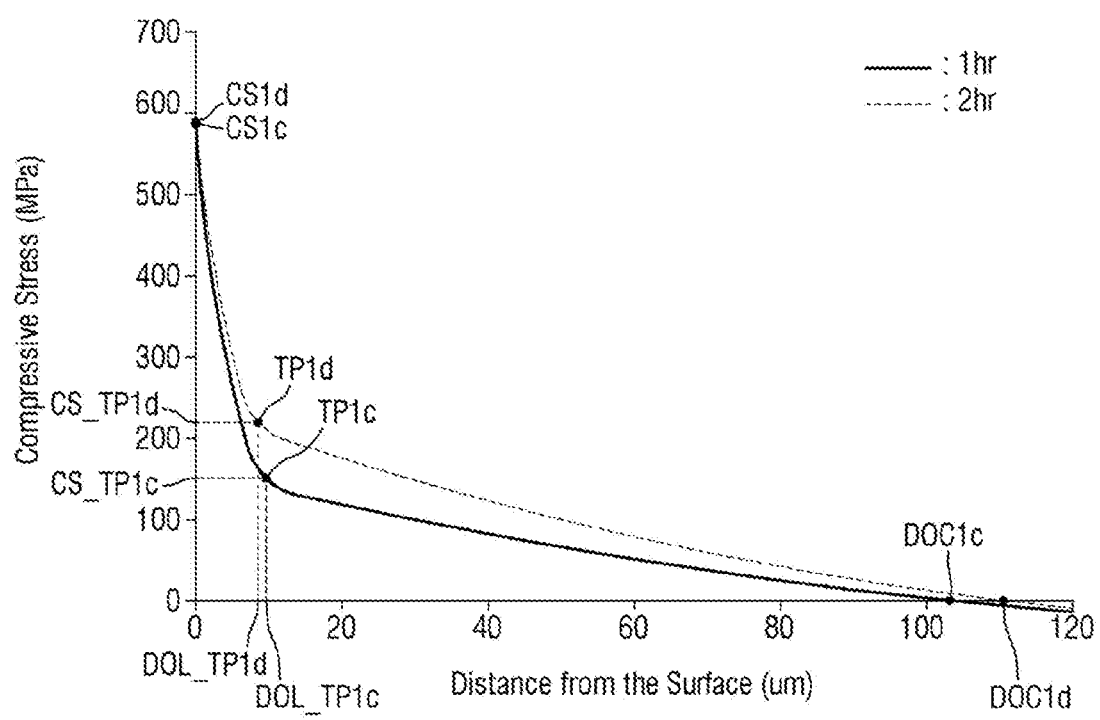

FIG. 13 is a graph showing a stress profile of a glass article subjected to an ion exchange process with a mixed molten salt of sodium nitrate and potassium nitrate having a mole fraction of sodium cations of 30 mol % at 390° C. for 1 hour or 2 hours.

It may be seen from FIG. 13 that the maximum compressive stress CS1 of the glass article 100 subjected to an ion exchange process for two hours had a similar value with that of the glass article 100 subjected to an ion exchange process for one hour (refer to CS1c and CS1d). The first compression depth DOC1 of the glass article 100 subjected to the ion exchange process for two hours had a larger value than that of the glass article 100 subjected to the ion exchange process for one hour (refer to DOC1c and DOC1d). The compression depth DOL_TP1 at the first transition point TP1 of the glass article 100 subjected to the ion exchange process for two hours had a smaller value than that of the glass article 100 subjected to the ion exchange process for one hour (refer to DOL_TP1c corresponding to TP1c and DOL_TP1d corresponding to TP1d). The compressive stress CS_TP1 at the first transition point TP1 of the glass article 100 subjected to the ion exchange process for two hours had a larger value than that of the glass article 100 subjected to the ion exchange process for one hour (refer to CS_TP1c corresponding to TP1c and CS_TP1d corresponding to TP1d).

Figure 14:
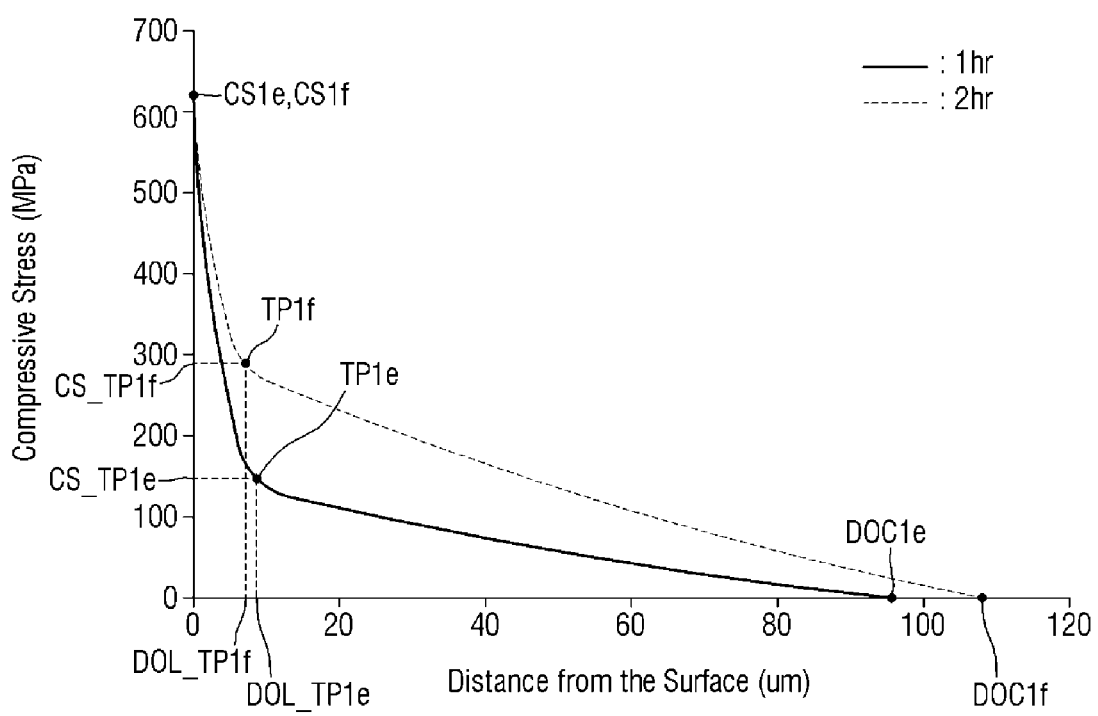

FIG. 14 is a graph showing a stress profile of a glass article 100 subjected to an ion exchange process with a mixed molten salt of sodium nitrate and potassium nitrate having a mole fraction of sodium cations of 20 mol % at 410° C. for 1 hour or 2 hours.

It may be seen from FIG. 14 that the maximum compressive stress CS1 of the glass article 100 subjected to an ion exchange process for two hours had a similar value with that of the glass article 100 subjected to an ion exchange process for one hour (refer to CS1e and CS1f). The first compression depth DOC1 of the glass article 100 subjected to the ion exchange process for two hours had a larger value than that of the glass article 100 subjected to the ion exchange process for one hour (refer to DOC1e and DOC1f). The compression depth DOL_TP1 at the first transition point TP1 of the glass article 100 subjected to the ion exchange process for two hours had a smaller value than that of the glass article 100 subjected to the ion exchange process for one hour (refer to DOL_TP1e corresponding to TP1e and DOL_TP1f corresponding to TP1f). The compressive stress CS_TP1 at the first transition point TP1 of the glass article 100 subjected to the ion exchange process for two hours had a smaller value than that of the glass article 100 subjected to the ion exchange process for one hour (refer to CS_TP1e and CS_TP1f corresponding to TP1f).

Figure 15:
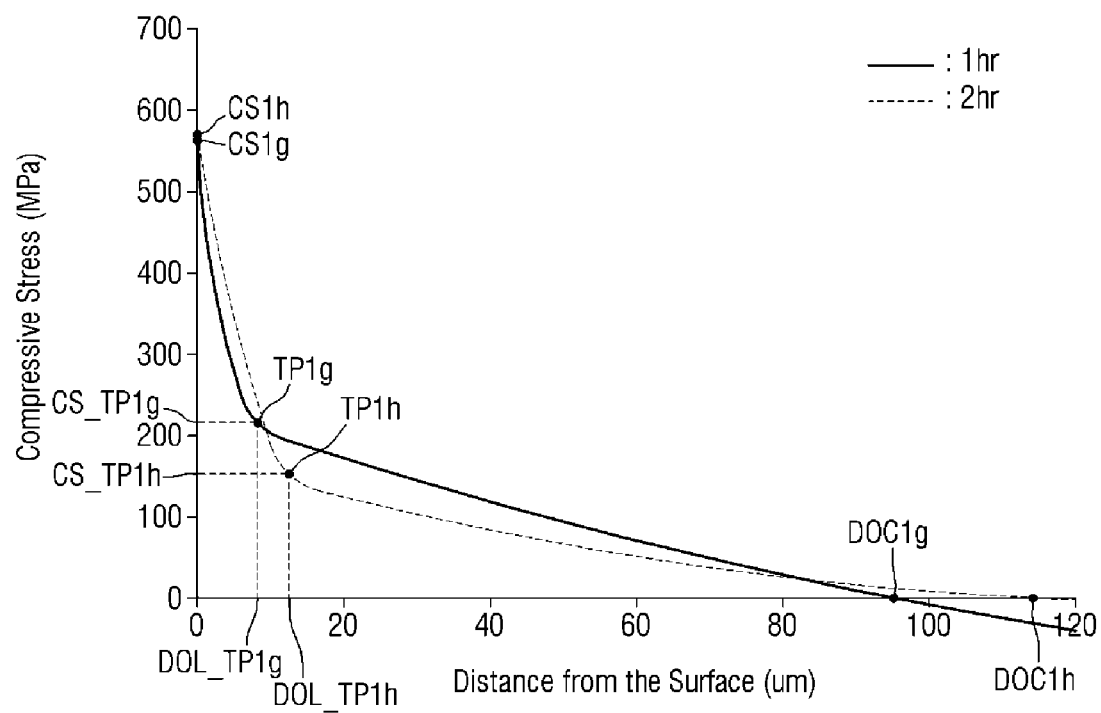

FIG. 15 is a graph showing a stress profile of a glass article 100 subjected to an ion exchange process with a mixed molten salt of sodium nitrate and potassium nitrate having a mole fraction of sodium cations of 30 mol % at 410° C. for 1 hour or 2 hours.

It may be seen from FIG. 15 that the maximum compressive stress CS1 of the glass article 100 subjected to an ion exchange process for two hours had a larger value than that of the glass article 100 subjected to an ion exchange process for one hour (refer to CS1g and CS1h). The first compression depth DOC1 of the glass article 100 subjected to the ion exchange process for two hours had a larger value than that of the glass article 100 subjected to the ion exchange process for one hour (refer to DOC1g and DOC1h). The compression depth DOL_TP1 at the first transition point TP1 of the glass article 100 subjected to the ion exchange process for two hours had a larger value than that of the glass article 100 subjected to the ion exchange process for one hour (refer to DOL_TP1g corresponding to TP1g and DOL_TP1h corresponding to TP1h). The compressive stress CS_TP1 at the first transition point TP1 of the glass article 100 subjected to the ion exchange process for two hours had a smaller value than that of the glass article 100 subjected to the ion exchange process for one hour (refer to CS_TP1g corresponding to TP1g and CS_TP1h corresponding to TP1h).

Figure 16:
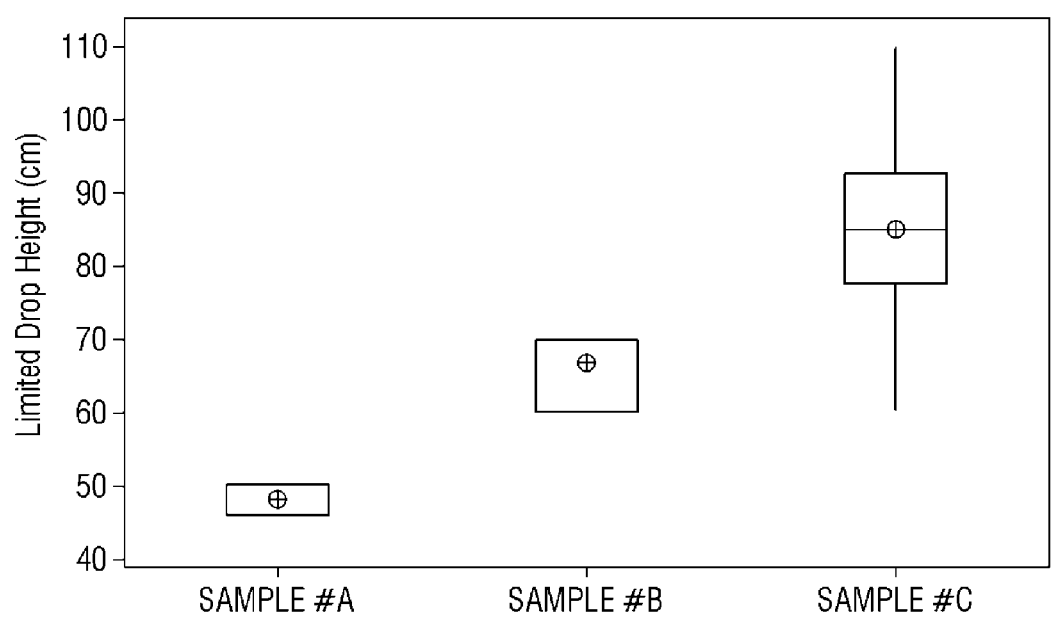
FIG. 16 is a graph showing the results of model drop tests for sample groups #A, #B, and #C.

FIG. 16 is a graph showing the results of model drop tests for sample groups #A, #B, and #C.

Sample group #A is the glass article 100 before tempering. Sample group #B is the glass article 100 subjected to an ion exchange process with a mixed molten salt of sodium nitrate and potassium nitrate having a mole fraction of 20 mol % to 30 mol % of sodium ions at approximately 390° C. to 410° C. for 1 to 2 hours. Sample group #C is the glass article 100, after the ion exchange process of Sample group #B, subjected to an additional ion exchange process with a mixed molten salt of sodium nitrate and potassium nitrate having 90 mol % to 95 mol % of potassium ions and 5 mol % to 10 mol % of sodium ions at approximately 370° C. to 390° C. for approximately 30 to 120 minutes.

A jig is used as a model for a smartphone in which each of sample groups is disposed (e.g., mounted). This test simulates the situation where each of the sample groups is applied to a completed smartphone. The jig may have, but is not limited to, the horizontal length of approximately 80 mm, the vertical length of approximately 160 mm, the height of approximately 5 mm, and the weight of 175 g. The model drop test was conducted twenty times by dropping the jig on which the glass sample was disposed (e.g., mounted) onto a granite, to check the height at which each of sample groups is broken.

When the jig to which sample groups #A, #B and #C are applied is dropped repeatedly by incrementing the height by 5 centimeter (cm) until it is broken. When the glass is broken, the last height before it is broken was determined as the limited drop height h, i.e., the maximum height the glass may withstand.

TABLE 2

| Sample Group | Limited Drop Height (cm) |
| --- | --- |
| #A | 48.2 |
| #B | 66.7 |
| #C | 85.0 |

Referring to Table 2, in the model drop test, the average value of the limited drop height of sample group #A was measured to be 48.2 cm, the average value of the limited drop height of sample group #B was measured to be 66.7 cm, and the average value of the limited drop height of sample group #C was measured to be 85.0 cm. Sample group #B was evaluated to have a lower surface strength than sample group #C. However, sample group #B exhibited an average value equal to or greater than 60 cm of the limited drop height, which is high enough to be used as a cover window, etc. The results were obtained after the model drop test was performed twenty times. Substantially the same test results would be obtained even after model drop test was performed more than twenty times.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. A glass article comprising lithium alumino-silicate ("LAS"), the glass article further comprising:
a first surface;
a second surface opposed to the first surface;
a first compressive region extended from the first surface to a first compression depth;
a second compressive region extended from the second surface to a second compression depth; and
a tensile region disposed between the first compression depth and the second compression depth,
wherein a stress profile in the first compressive region comprises a first segment provided between the first surface and a first transition point and a second segment provided between the first transition point and the first compression depth,
wherein a ratio of a stress at the first transition point to a stress at the first surface ranges from 0.22 to 0.47,
wherein a stress profile in the second compressive region is symmetrical to the stress profile in the first compressive region, and
wherein a depth of the first transition point is in a range of 0.011 to 0.014 times of a thickness of the glass article.

2. The glass article of claim 1, wherein a compressive stress at the first surface ranges from 450 megapascals to 650 megapascals.

3. The glass article of claim 1, wherein the depth of the first transition point ranges from 7 micrometers to 15 micrometers, and
wherein the stress at the first transition point ranges from 100 megapascals to 220 megapascals.

4. The glass article of claim 1, wherein the first compression depth ranges from 90 micrometers to 120 micrometers.

5. The glass article of claim 4, wherein a ratio of the depth of the first transition point to the first compression depth ranges from 0.077 to 0.125.

6. The glass article of claim 1, wherein an average slope of the first segment has a first slope, wherein an average slope of the second segment has a second slope, and
wherein an absolute value of the first slope is greater than an absolute value of the second slope.

7. The glass article of claim 6, wherein the absolute value of the second slope ranges from 1.5 to 2.9.

8. The glass article of claim 1, wherein the first compression depth is a maximum permeation depth of sodium ions, while a depth of the first transition point is a maximum permeation depth of potassium ions.

9. The glass article of claim 1, wherein the glass article exhibits an average value of 60 centimeter of a limited drop height in a test where the glass article is disposed on a jig having a horizontal length of 80 millimeters, a vertical length of 160 millimeters and a height of 5 millimeters and the jig is dropped onto on a granite twenty times or more, to determine the limited drop height.

10. A glass article produced via a single-stage tempering process, the glass article comprising:
a first surface;
a second surface opposed to the first surface;
a first compressive region extended from the first surface to a first compression depth;
a second compressive region extended from the second surface to a second compression depth; and
a tensile region disposed between the first compression depth and the second compression depth,
wherein a compressive stress of the first surface ranges from 450 megapascals to 650 megapascals,
wherein the first compression depth ranges from 90 micrometers to 120 micrometers, wherein a stress profile of the first compressive region has a first transition point at a depth of 7 micrometers to 15 micrometers and a stress of 100 megapascals to 220 megapascals, wherein a ratio of a stress at the first transition point to a stress at the first surface ranges from 0.22 to 0.47, wherein a stress profile in the second compressive region is symmetric with the stress profile in the first compressive region, and wherein the depth of the first transition point is in a range of 0.011 to 0.014 times of a thickness of the glass article.

11. The glass article of claim 10, wherein the stress profile of the first compressive region comprises a first segment provided between the first surface and the first transition point and a second segment provided between the first transition point and the first compression depth, wherein an average slope of the first segment has a first slope, wherein an average slope of the second segment has a second slope, and wherein an absolute value of the first slope ranges from 33.2 to 54.6.

12. The glass article of claim 11, wherein the absolute value of the first slope is greater than an absolute value of a second slope.

13. The glass article of claim 12, wherein the absolute value of the second slope ranges from 1.5 to 2.9.

14. The glass article of claim 10, wherein the first compression depth is a maximum permeation depth of sodium ions, while the depth of the first transition point is a maximum permeation depth of potassium ions.

15. The glass article of claim 10, wherein a ratio of the depth of the first transition point to the first compression depth ranges from 0.077 to 0.125.

16. The glass article of claim 10, wherein the glass article exhibits an average value of 60 centimeter of a limited drop height in a test where the glass article is disposed on a jig having a horizontal length of 80 millimeters, a vertical length of 160 millimeters and a height of 5 millimeters and the jig is dropped onto on a granite twenty times or more, to determine the limited drop height.

* * * * *